US011512791B2

(12) United States Patent
Morgan et al.

(10) Patent No.: US 11,512,791 B2
(45) Date of Patent: *Nov. 29, 2022

(54) OVERMOLDED OR PRESSED-IN SLEEVE FOR HYDRAULIC ROUTING OF SOLENOID

(71) Applicant: Solero Technologies, LLC, Water Valley, MS (US)

(72) Inventors: Kenneth W. Morgan, Lake Orion, MI (US); Michael E. Jones, Lake Orion, MI (US)

(73) Assignee: Solero Technologies, LLC, Water Valley, MS (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/183,869

(22) Filed: Feb. 24, 2021

(65) Prior Publication Data

US 2021/0190229 A1    Jun. 24, 2021

Related U.S. Application Data

(63) Continuation of application No. 15/897,794, filed on Feb. 15, 2018, now Pat. No. 10,962,134, which is a
(Continued)

(51) Int. Cl.
*F16K 31/06* (2006.01)
*F16K 3/26* (2006.01)
(Continued)

(52) U.S. Cl.
CPC .......... *F16K 31/0668* (2013.01); *F16K 3/262* (2013.01); *F16K 11/0716* (2013.01);
(Continued)

(58) Field of Classification Search
CPC ............. F16K 31/0668; F16K 31/0613; F16K 11/0716; F16K 27/048; F16K 3/262;
(Continued)

(56) References Cited

U.S. PATENT DOCUMENTS 2,522,249 A    9/1950  Baker
3,271,845 A    9/1966  Breher
(Continued)

FOREIGN PATENT DOCUMENTS

CN    1894529 A    1/2007
DE    3137328 A1   4/1983
(Continued)

OTHER PUBLICATIONS

English language abstract and machine-assisted English translation for DE 10 2005 049 124 extracted from espacenet.com database on Apr. 29, 2020, 7 pages.
(Continued)

*Primary Examiner* — Mary E McManmon
*Assistant Examiner* — Nicole Gardner
(74) *Attorney, Agent, or Firm* — Warner Norcross + Judd LLP

(57) ABSTRACT

A valve having a metal insert with a fluid passage formed in the metal insert. A composite valve body is disposed at least partially around the metal insert and having at least one port in fluid communication with the fluid passage with the metal insert. A valve member is partially disposed in the metal insert and operable to control the fluid flow through the fluid passage of the metal insert and parts of the valve body.

19 Claims, 3 Drawing Sheets

Related U.S. Application Data continuation of application No. 14/268,047, filed on May 2, 2014, now Pat. No. 9,927,045, which is a continuation of application No. 12/988,811, filed as application No. PCT/US2009/023987 on Apr. 2, 2009, now Pat. No. 8,757,209.

(60) Provisional application No. 61/125,703, filed on Apr. 28, 2008.

(51) Int. Cl.
*F16K 11/07* (2006.01)
*F16K 27/04* (2006.01)
*H01F 7/16* (2006.01)
*H01F 7/08* (2006.01)

(52) U.S. Cl.
CPC ........ *F16K 27/048* (2013.01); *F16K 31/0613* (2013.01); *H01F 7/1607* (2013.01); *H01F 2007/085* (2013.01); *Y10T 29/49412* (2015.01); *Y10T 137/86622* (2015.04); *Y10T 137/86702* (2015.04)

(58) Field of Classification Search
CPC ..... Y10T 137/86622; Y10T 137/86702; Y10T 137/86614
See application file for complete search history.

(56) References Cited

U.S. PATENT DOCUMENTS

| | | | |
|---|---|---|---|
| 3,574,311 A | 4/1971 | Fairbanks | |
| 3,643,700 A | 2/1972 | Black | |
| 3,927,830 A | 12/1975 | Briski | |
| 3,952,996 A | 4/1976 | Hart | |
| 4,538,645 A | 9/1985 | Perach | |
| 4,570,601 A | 2/1986 | Ito et al. | |
| 4,790,513 A | 12/1988 | Davis et al. | |
| 4,988,077 A | 1/1991 | Conley et al. | |
| 5,076,537 A | 12/1991 | Mears, Jr. | |
| 5,269,490 A | 12/1993 | Fujikawa et al. | |
| 5,358,215 A | 10/1994 | Buth et al. | |
| 5,460,198 A | 10/1995 | Kortge | |
| 5,513,673 A | 5/1996 | Slavin et al. | |
| 5,518,029 A | 5/1996 | Schumacher et al. | |
| 5,551,482 A | 9/1996 | Dixon et al. | |
| 5,615,860 A | 4/1997 | Brehm et al. | |
| 5,778,932 A | 7/1998 | Alexander | |
| 5,878,782 A | 3/1999 | Nakajima | |
| 6,012,700 A | 1/2000 | Johnson et al. | |
| 6,041,807 A | 3/2000 | Honaga et al. | |
| 6,220,275 B1 | 4/2001 | Nishinosono et al. | |
| 6,336,470 B1 | 1/2002 | Zapf | |
| 6,526,864 B2 | 3/2003 | Lindler et al. | |
| 6,834,676 B2 | 12/2004 | Kulmann | |
| 6,880,800 B2 | 4/2005 | Zweigle et al. | |
| 7,121,243 B2 | 10/2006 | Yoshijima et al. | |
| 7,243,680 B2 | 7/2007 | Golovatai-Schmidt et al. | |
| 7,389,756 B2 | 6/2008 | Hoppe et al. | |
| 7,487,798 B2 | 2/2009 | Furuta et al. | |
| 7,766,040 B2 | 8/2010 | Bamber | |
| 8,757,209 B2 | 6/2014 | Morgan et al. | |
| 9,927,045 B2 | 3/2018 | Morgan et al. | |
| 2003/0201020 A1 | 10/2003 | Kulmann | |
| 2004/0154672 A1 | 8/2004 | Liberfarb | |
| 2004/0173269 A1 | 9/2004 | Fleischer et al. | |
| 2005/0133632 A1 | 6/2005 | Hornby | |
| 2005/0218363 A1 | 10/2005 | Furuta et al. | |
| 2006/0011158 A1 | 1/2006 | Yoshijima et al. | |
| 2008/0295800 A1* | 12/2008 | Bolinger | F02D 9/1035 123/337 |
| 2010/0139795 A1 | 6/2010 | Holmes et al. | |
| 2014/0239211 A1 | 8/2014 | Morgan et al. | |
| 2018/0231139 A1 | 8/2018 | Morgan et al. | |

FOREIGN PATENT DOCUMENTS

| | | |
|---|---|---|
| DE | 3224119 A1 | 12/1983 |
| DE | 4221757 A1 | 1/1994 |
| DE | 19847021 A1 | 4/2000 |
| DE | 10028567 A1 | 12/2000 |
| DE | 10340932 A1 | 3/2005 |
| DE | 102005049124 A1 | 4/2007 |
| DE | 102005052481 A1 | 5/2007 |
| EP | 0909912 A2 | 4/1999 |
| JP | S55163582 U | 11/1980 |
| JP | S61141878 A | 6/1986 |
| JP | H10222237 A | 8/1998 |
| JP | H1187133 A | 3/1999 |
| JP | 2000357016 A | 12/2000 |
| JP | 2006064158 A | 3/2006 |
| WO | 9924721 A1 | 5/1999 |
| WO | 2008039500 A1 | 4/2008 |

OTHER PUBLICATIONS

English language abstract and machine-assisted English translation for DE 100 28 567 extracted from espacenet.com database on Apr. 29, 2020, 10 pages.

English language abstract and machine-assisted English translation for DE 103 40 932 extracted from espacenet.com database on Feb. 28, 2018, 13 pages.

English language abstract and machine-assisted English translation for DE 198 47 021 extracted from espacenet.com database on Apr. 29, 2020, 7 pages.

English language abstract and machine-assisted English translation for DE 31 37 328 extracted from espacenet.com database on Apr. 29, 2020, 6 pages.

English language abstract and machine-assisted English translation for DE 42 21 757 extracted from espacenet.com database on Apr. 29, 2020, 11 pages.

English language abstract and machine-assisted English translation for EP 0 909 912 extracted from espacenet.com database on Apr. 29, 2020, 6 pages.

English language abstract and machine-assisted English translation for JP 2000-3570216 extracted from espacenet.com database on Feb. 28, 2018, 15 pages.

English language abstract and machine-assisted English translation for JP 2006-064158 extracted from espacenet.com database on Feb. 12, 2016, 8 pages.

English language abstract and machine-assisted English translation for JPH 10-222237 extracted from espacenet.com database on Feb. 28, 2018, 24 pages.

English language abstract and machine-assisted English translation for JPH 11-87133 extracted from espacenet.com database on Feb. 28, 2018, 27 pages.

English language abstract and machine-assisted English translation for JPS 61-141878 extracted from espacenet.com database on Feb. 28, 2018, 6 pages.

English language abstract and machine-assisted translation for JP 2006-064158 extracted from espacenet.com database on Feb. 12, 2016, 7 pages.

English language abstract for CN 1894529 extracted from espacenet.com database on Feb. 12, 2016, 2 pages.

English language abstract for DE 10 2005 052 481 extracted from espacenet.com database on Apr. 29, 2020, 2 pages.

International Search Report for Application No. PCT/US2009/039287 dated Nov. 17, 2009, 2 pages.

Machine-assisted English translation for DE 32 24 119 extracted from espacenet.com database on Apr. 29, 2020, 7 pages.

Machine-assisted English translation for JPS 55-163582 extracted from espacenet.com database on Feb. 28, 2018, 4 pages.

\* cited by examiner

OVERMOLDED OR PRESSED-IN SLEEVE FOR HYDRAULIC ROUTING OF SOLENOID

CROSS-REFERENCE TO RELATED APPLICATIONS

This application is a continuation of U.S. patent application Ser. No. 15/897,794 filed on Feb. 15, 2018, which is a continuation of U.S. patent application Ser. No. 14/268,047 filed on May 2, 2014, now U.S. Pat. No. 9,927,045 issued on Mar. 27, 2018, which is a continuation of U.S. patent application Ser. No. 12/988,811 filed on Dec. 20, 2010, now U.S. Pat. No. 8,757,209 issued on Jun. 24, 2014, which is the National Stage of International Application No. PCT/US2009/039287 filed on Apr. 2, 2009, which claims priority to U.S. Provisional Patent Application No. 61/125,703 filed on Apr. 28, 2008. The disclosures of the above applications are herein incorporated by reference in their entirety.

FIELD OF THE INVENTION

The present invention relates to overmolded solenoid valve bodies, and more specially solenoid valves having metal sleeves pressed in or overmolded to a composite valve body.

BACKGROUND OF THE INVENTION

Solenoid valves for automotive components have become common place in the industry. The solenoid valves are used to control various hydraulic components such as transmission, clutch, turbocharger, drive line components, and exhaust control components. Typically, solenoid valves have a valve body that is actuated by a solenoid portion which consists of an electromagnetic coil having an armature that moves in response to the application of current to the electromagnetic portion. In the past the valve bodies have been made out of machined metal components. The flow path through the valve body has been defined by forming holes and bores in the metal valve body. The trend in solenoid designs has been to increase their ability through the use of more complex flow paths through the valve body itself. Thus, there is an increased need for more comprehensive fluid passages in the valve body in order to make the solenoid valve more versatile and keep up with the performance demands that exist in the industry. Additionally, suppliers have an interest in being able to manufacture solenoid valves in a more cost effective manner to be able to offer the marketplace a lower cost, higher performance product.

SUMMARY OF THE INVENTION

The present invention relates to a valve having a metal insert with a fluid passage formed in the metal insert. A composite valve body is disposed at least partially around the metal insert and having at least one port in fluid communication with the fluid passage of the metal insert. A valve member is partially disposed in the metal insert and operable to control the fluid flow through the fluid passage of the metal insert and parts of the valve body.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
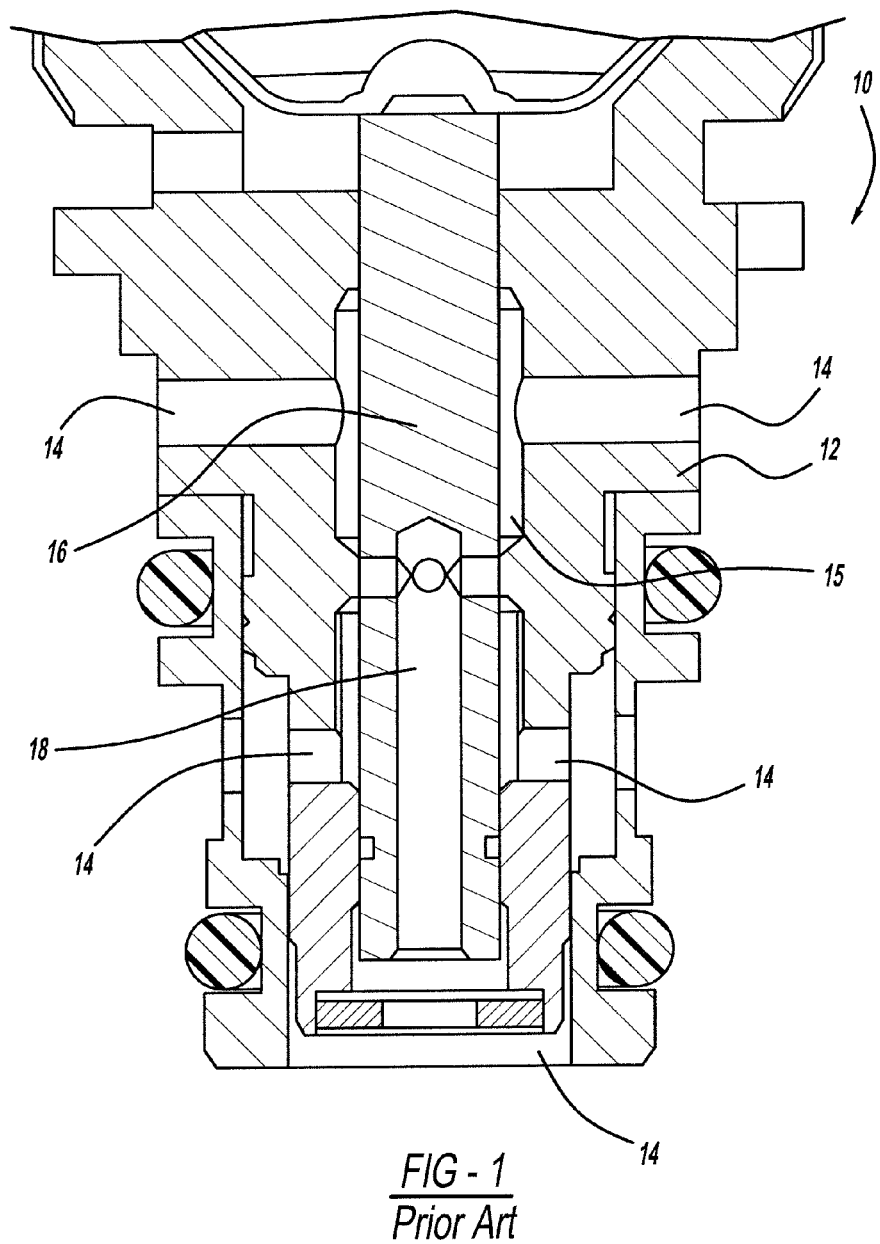
FIG. 1 is a cross-sectional plan view of a prior art valve portion.

Referring now to FIG. 1, a prior art solenoid valve assembly 10 is shown. The valve assembly 10 has a metal valve body 12 having machined ports 14 which are typically formed in the metal valve body 12 by boring or milling through the metal valve body 12. The machined ports 14 extend into a machined bore 15 which is also formed in the metal valve body 12. A valve member 16 is slideably positioned within the machined bore 15 of the metal valve body 12. The valve member 16 has a fluid passage 18 that is used to communicate fluid between the machined ports.

Figure 2:
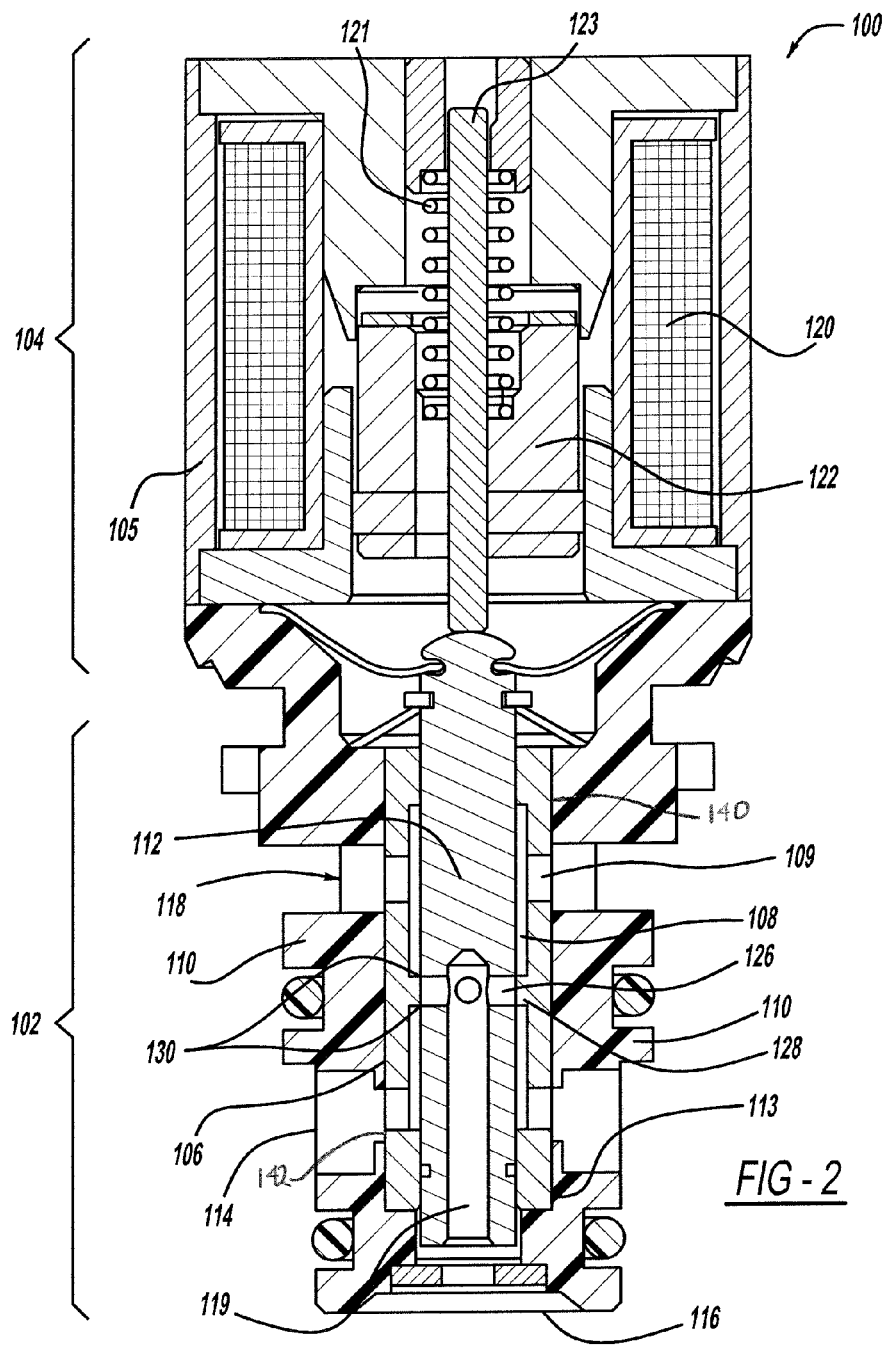
FIG. 2 is a cross-sectional plan view in accordance with a present embodiment of the invention.

FIG. 2 is a cross-sectional view of a composite pressure control solenoid valve assembly 100 in accordance with the present embodiment of the invention. The valve assembly 100 has a valve portion 102 and a solenoid actuator portion 104. The solenoid actuator portion 104 and valve portion 102 can be separate or integrated and be made from the same material. The valve portion 102 has a composite valve body 110 that is made of a composite material which is molded from composite resin. The composite material that makes up the composite body 110 would be any type of suitable plastic material. More specifically, thermal plastics such as polyamids, including nylon, polyphthalamides, and liquid crystal polymers. However, the principle materials used are not necessarily limited to these particular materials, other plastic materials may be more suitable for a particular application.

The composite valve body 110 has one or more ports molded therein. In this particular embodiment, the one or more ports include a supply port 114, control port 116, and exhaust port 118. Each of the ports 114, 116, 118 extend to a bore of the composite valve body 110. The bore of the valve body 113 is formed through the molding process or processes described below. Additionally, the greater of lesser numbers of ports can be implemented based on the design of a particular application.

Within the bore 113 of the composite valve body 110 is a metal insert 106. A fluid passage 108 with several apertures 109 that extend from the exterior of the metal insert 106 to the fluid passage 108 are formed in the metal insert 106. The fluid passage 108 is formed by machining the metal insert 106. The metal insert 106 is positioned in the bore 113 of the composite valve body 110. The metal insert 106 can be placed within the bore 113 of the composite valve body 110 by overmolding the composite valve body 110 around the metal insert 106. Another process involves press fitting the metal insert 106 into the already formed valve body 110.

The apertures 109 of the metal insert 106 are configured to align with one or more of the ports 114, 116, 118 of the composite valve body 110. This allows for fluid communication from outside of the composite valve body 110 to flow into the fluid passage 108 of the metal insert 106.

A spool valve member 112 is slideably positioned within the metal insert 106 and has a fluid passage 119 formed therein. The fluid passage 119 in this particular embodiment communicates with the control port 116 and the supply port 114 and exhaust port 118 through metering orifices 126. The metal insert 106 has upper and lower bearings 140, 142 aligning the spool valve 112. The metal insert 106 has metering lands 128 formed in the fluid passage 108 of the metal insert 106. The metering lands 128 align with the metering orifices 126 and function to control the flow of fluid through the metering orifices 126 when the valve member 112 is placed in a position where the metering orifices 126 are aligned with the metering lands 128. The metering lands 128 have metering edges 130 that permit the flow of fluid through the metering orifices 126 when the valve member 112 is moved axially within the fluid passage 108 of the metal insert 106.

The valve assembly 100 of the present embodiment significantly reduces the production cost and manufacturing time when compared to the prior art valve of FIG. 1. The composite valve body 110 is less expensive and easier to form than the metal valve body 12. The metal insert 106 and the valve member 112 are the only components that have to be machined. These components are smaller and present less metal that has to be machined. Additionally, the valve member 112 and metal inset 106 can be preassembled and checked for quality prior to being placed in the composite valve body 110. This also saves time and even allows the metal insert 106 and valve member 112 to be manufactured separately which also presents cost savings.

The valve assembly 100 has an actuator portion 104 which in the present embodiment of the invention is a solenoid portion. The actuator portion has a housing 105 that can be a separate component; however, in this particular embodiment of the invention the housing 105 is a composite housing that is integral with the composite valve body 100 of the valve portion 102. Within the actuator portion 104 is a coil 120 that when energized causes an armature 122 to move axially. A pin 123 is connected to the armature 122 and contacts the valve member 112 of the valve portion 102 in order to cause the valve member 112 to move axially within the metal insert 106. A spring 121 is operably connected to the pin 123 for biasing the armature in one direction when the coil 120 is not energized.

The present invention provides a composite valve body 110 that is formed by molding composite resins. This lowers the over all cost of production and also provides the advantage of being able to form more complex fluid passages within the composite valve body 110 while eliminating the machining step that would normally be required for a metal valve body 12 as shown in FIG. 1. Furthermore, there are fluid passages that can be molded into the composite valve body 110 that could not be easily formed in a traditional metal valve body 12.

The present invention also includes a method of making a composite solenoid valve or valve assembly 100 as shown in FIG. 2. The method of making the valve assembly 100 includes providing the metal insert 106, composite valve body 110, valve member 112, fluid passage 119 of valve member 112, and at least one port 114, 116, 118 in the composite valve body 110 and apertures 109 in the metal insert 106. The step of forming the fluid passage 119 in the metal insert 106 is carried out by machining or drilling the fluid passage from metal stock.

The valve member 112 also has fluid passages 119 and apertures 126 machined or formed by machining and boring the passages out of the valve member 112. While the present invention describes a valve member 112 that is formed of metal it is within the scope of this invention to have the valve member 112 also formed from composite material whereby the fluid passages and apertures are formed through a molding process. The valve member 112 has been placed in the fluid passage 108 of the metal insert 106.

Figure 3:
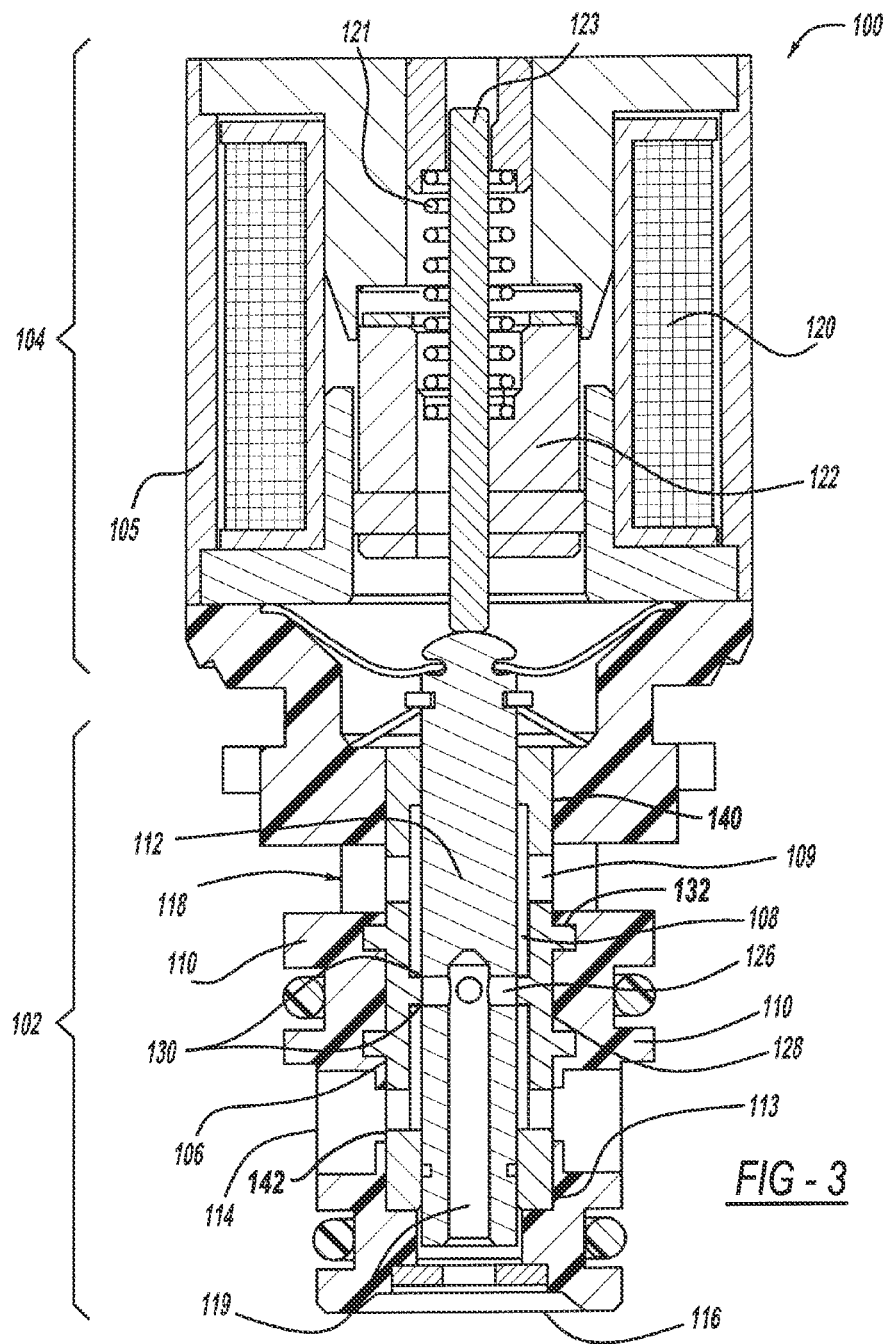
FIG. 3 is a cross-sectional plan view in accordance with a further embodiment of the invention.

The valve member 112 is then placed in a slidable arrangement within the fluid passage 108 of the metal insert 106. The metal insert 106 is then connected to the composite valve body 110. This process can be carried out in several different ways. One process is to press fit the metal insert 106 into an already formed composite valve body 110. Another step involves placing the metal insert 106 into a mold and then overmolding the composite valve body 110 around the metal insert 106. The supply port 114, control port 116, and exhaust port 118 are formed in the composite valve, body 110 either through the overmolding process or by drilling the ports through the formed composite valve body 110. As shown in FIG. 3, the metal insert 106 may have a stepped or mold feature 132 on its exterior surface such that in order to more tightly secure the metal insert 106 to the valve body 110. Such features will eliminate any possible leaking that can occur between the plastic and the metal and also to insure retention of the metal insert.

If the actuator portion 104 is separate from the valve portion 102 then the actuator is connected to the composite valve body 110. Alternatively, the casing 105 of the actuator portion 104 can be overmolded in the same or separate step as the metal insert 106 is overmolded with the composite valve body 110. Thus, the casing 105 of the actuator portion 104 can be integral with the composite valve body 110.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A solenoid pressure control valve comprising:
   a metal insert having a fluid passage formed in said metal insert;
   a composite valve body disposed at least partially around said metal insert, wherein said composite valve body has a bore where said metal insert is positioned;
   a supply port disposed through said composite valve body and said metal insert, wherein said supply port is connected to said fluid passage;
   a control port disposed through said composite valve body and said metal insert, wherein said control port is connected to said fluid passage;
   a valve member at least partially disposed in said metal insert for controlling the flow of fluid medium between said supply port and said control port by moving with respect to said metal insert; and
   a solenoid portion having a coil with an armature moveable within said solenoid portion in response to energization of said coil, wherein said armature causes said valve member to slide within said fluid passage;
   wherein said composite valve body is composed of a thermoplastics material; and
   wherein said thermoplastics material is further defined as a polyamid.

2. The solenoid pressure control valve of claim 1, wherein said polyamid is composed of polyphthalamides.

3. A solenoid pressure control valve comprising:
a metal insert having a fluid passage formed in said metal insert;
a composite valve body having a bore;
a supply port disposed through said composite valve body and said metal insert, wherein said supply port is connected to said fluid passage;
a control port disposed through said composite valve body and said metal insert, wherein said control port is connected to said fluid passage;
a valve member at least partially disposed in said metal insert for controlling the flow of fluid medium between said supply port and said control port with respect to said metal insert; and
a solenoid portion having a coil with an armature moveable within said solenoid portion in response to energization of said coil, wherein said armature causes said valve member to slide within said fluid passage;
wherein one of said metal insert and said valve member presents a metering land for controlling the flow of fluid medium through said fluid passage, and the other one of said metal insert and said valve member defines a metering orifice for fluidly communicating said fluid passage with at least one of said control port and said supply port;
wherein said metal insert is positioned in said bore of said composite valve body; and
wherein said composite valve body is disposed around said metal insert.

4. The solenoid pressure control valve of claim 3, wherein said metal insert has an exterior metal insert surface having a stepped or mold feature, and wherein said composite valve body is at least partially disposed in said stepped or mold feature for securing said metal insert to said composite valve body.

5. The solenoid pressure control valve of claim 3, wherein said composite valve body is overmolded around said metal insert.

6. The solenoid pressure control valve of claim 3, wherein said metal insert extends along an axis between a first metal insert end adjacent said solenoid portion and a second metal insert end spaced from said first metal insert end with respect to said axis such that said first metal insert end is disposed between said second metal insert end and said solenoid portion with respect to said axis, and wherein said first and second metal insert ends are positioned in said bore of said composite valve body with respect to said axis.

7. The solenoid pressure control valve of claim 6, wherein said composite valve body extends along said axis between a first valve body end adjacent said solenoid portion and a second valve body end spaced from said second metal end with respect to said axis such that said first valve body end is disposed between said second valve body end and said solenoid portion with respect to said axis, and wherein said first and second metal insert ends are disposed between said first and second valve body ends with respect to said axis such that said composite valve body has a length defined between said first and second valve body ends that is greater than a length defined between said first and second metal insert ends with respect to said axis.

8. The solenoid pressure control valve of claim 6, wherein said control port is disposed through said composite valve body and said metal insert parallel to said axis.

9. The solenoid pressure control valve of claim 8, wherein said supply port is disposed through said composite valve body and said metal insert perpendicular to said axis.

10. The solenoid pressure control valve of claim 6, further comprising an exhaust port disposed through said composite valve body and said metal insert perpendicular to said axis, wherein said exhaust port is connected to said fluid passage, wherein said control port is disposed through said composite valve body and said metal insert parallel to said axis, and wherein said supply port is disposed through said composite valve body and said metal insert perpendicular to said axis.

11. The solenoid pressure control valve of claim 3, further comprising an exhaust port disposed through said composite valve body and said metal insert, wherein said exhaust port is connected to said fluid passage.

12. The solenoid pressure control valve of claim 3,
wherein said composite valve body is overmolded around said metal insert;
wherein said metal insert extends along an axis between a first metal insert end adjacent said solenoid portion and a second metal insert end spaced from said first metal insert end with respect to said axis such that said first metal insert end is disposed between said second metal insert end and said solenoid portion with respect to said axis, and wherein said first and second metal insert ends are positioned in said bore of said composite valve body with respect to said axis;
wherein said composite valve body extends along said axis between a first valve body end adjacent said solenoid portion and a second valve body end spaced from said second metal end with respect to said axis such that said first valve body end is disposed between said second valve body end and said solenoid portion with respect to said axis, and wherein said first and second metal insert ends are disposed between said first and second valve body ends with respect to said axis such that said composite valve body has a length defined between said first and second valve body ends that is greater than a length defined between said first and second metal insert ends with respect to said axis; and
further comprising an exhaust port disposed through said composite valve body and said metal insert perpendicular to said axis, wherein said exhaust port is connected to said fluid passage, wherein said control port is disposed through said composite valve body and said metal insert parallel to said axis, and wherein said supply port is disposed through said composite valve body and said metal insert perpendicular to said axis.

13. The solenoid pressure control valve of claim 12, wherein said metal insert has an exterior metal insert surface having a stepped or mold feature, and wherein said composite valve body is at least partially disposed in said stepped or mold feature for securing said metal insert to said composite valve body.

14. The solenoid pressure control valve of claim 13, wherein said composite valve body is composed of a thermoplastics material, and wherein said thermoplastics material is further defined as a polyamid.

15. A method of making a solenoid pressure control valve including a metal insert, a composite valve body, a valve member, a fluid passage, and at least one port, said method comprising the steps of:
forming the fluid passage in the metal insert;
placing the valve member in the fluid passage;

overmolding the composite valve body to the metal insert such that the composite valve body has a bore and surrounds the metal insert; and forming the at least one port in the composite valve body, wherein the at least one port is operably connected to the fluid passage.

16. The method of claim 15, wherein the metal insert has an exterior metal insert surface having a stepped or mold feature, and wherein the composite valve body is at least partially disposed in the stepped or mold feature for securing the metal insert to the composite valve body.

17. The method of claim 15, further comprising the step of:

providing a solenoid portion having a coil with an armature moveable within the solenoid portion in response to energization of the coil, wherein the armature causes the valve member to slide within the fluid passage.

18. The method of claim 17, wherein the metal insert extends along an axis between a first metal insert end adjacent the solenoid portion and a second metal insert end spaced from the first metal insert end with respect to the axis such that the first metal insert end is disposed between the second metal insert end and the solenoid portion with respect to the axis, and wherein the first and second metal insert ends are positioned in the bore of the composite valve body.

19. The method of claim 18, wherein the valve body extends along the axis between a first valve body end adjacent the solenoid portion and a second valve body end spaced from the second metal end with respect to the axis such that the first valve body portion is disposed between the second valve body portion and the solenoid portion with respect to the axis, and wherein the first and second metal insert ends are disposed between the first and second valve body ends with respect to the axis such that the composite valve body has a length defined between the first and second valve body ends that is greater than a length defined between the first and second metal insert ends with respect to the axis.

* * * * *